No. 12,169. REISSUED NOV. 10, 1903.

R. A. FESSENDEN.

WIRELESS TELEGRAPHY.

APPLICATION FILED OCT. 20, 1903.

Witnesses:

Alex. Scott

Geo. E. Gauntt

Inventor:

Reginald A. Fessenden by Dennis S. Wolcott

Atty

No. 12,169. Reissued November 10, 1903.

UNITED STATES PATENT OFFICE.

REGINALD A. FESSENDEN, OF WASHINGTON, DISTRICT OF COLUMBIA, ASSIGNOR OF ONE-THIRD TO DARWIN S. WOLCOTT, OF SEWICKLEY, PENNSYLVANIA.

WIRELESS TELEGRAPHY.

SPECIFICATION forming part of Reissued Letters Patent No. 12,169, dated November 10, 1903.

Original No. 706,737, dated August 12, 1902. Application for reissue filed October 20, 1903. Serial No. 177,830.

DIVISION B.

*To all whom it may concern:*

Be it known that I, REGINALD A. FESSENDEN, a citizen of the United States, formerly residing at Allegheny, in the county of Allegheny, in the State of Pennsylvania, but now residing at Washington, in the District of Columbia, have invented or discovered certain new and useful Improvements in Wireless Telegraphy, of which improvements the following is a specification.

The invention described herein relates to certain improvements in transmission of energy by electromagnetic waves, and has for its object the production of more efficient conductors.

The invention is hereinafter more fully described and claimed.

Figure 1:
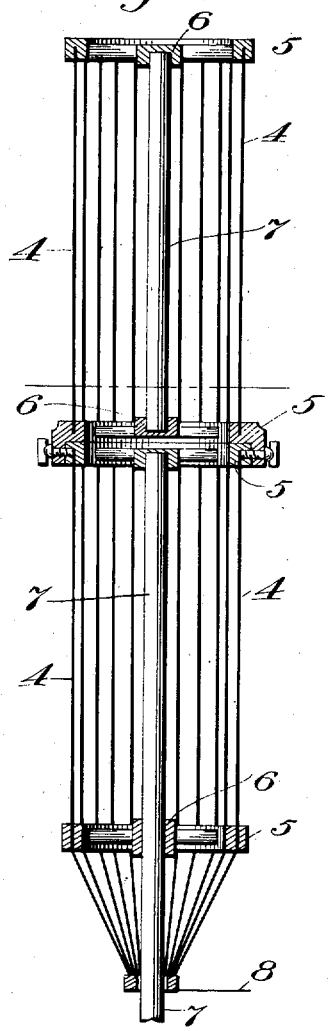
Figure 2:
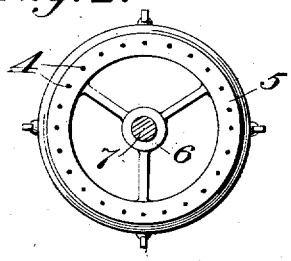

In the accompanying drawings, forming a part of this specification, Figure 1 is a sectional elevation of a form of apparatus for the practice of my invention. Fig. 2 is a top plan view of the same.

In a divisional application for reissue, Serial No. 177,829, I have described and shown two species of conductors for use in the transmission of energy by electromagnetic waves. One of the species—namely, the conductor shown in Figs. 1, 2, and 5 thereof—having large capacity because of its large superficial area is claimed therein. The other species, being the open construction shown in Fig. 3 of said application, in which the effect of the large-capacity area is obtained by the use of conductors having a small total area, but suitably arranged to have large capacity, forms the subject-matter of the present case. I have discovered that better results are secured by using large capacities uniformly distributed so far as is practicable, since in this way a much closer approximation to a true sine wave is obtained on account of less harmonics being generated, and for other reasons, some of which are set forth in the divisional case, Serial No. 177,829. Such a conductor is shown in Fig. 1 of said divisional case, having its radiating portion constructed so as to have large uniformly-distributed capacity by reason of its large superficial area. A conductor of large uniformly-distributed capacity without such large superficial area may be constructed as shown in Fig. 3 of application Serial No. 177,829 and in Fig. 1 of this application, having its radiating portion in the form of a cylindrical cage, consisting of a number of parallel wires 4, secured at the ends to supporting-rings 5, provided with hubs or central sockets 6 for the reception of supporting-rods 7, formed of bamboo or other light non-conducting material. As stated in application Serial No. 177,829, this construction gives a conductor of low resistance. By this is meant a resistance which does not act to appreciably cut down the oscillations or to distort the form of the wave. By "large capacity," as herein used, is meant a capacity large as compared with single wires of equal length heretofore commonly used in the art.

For convenience it is preferred to form the conductors in sections, which can be mechanically and electrically connected by the supporting-rings, as shown. As the capacity of the ring 5 is small compared to that of a sending-conductor, the intensity of the independent frequencies of the waves so produced will be negligible. This conductor may be connected to ground in any suitable manner, as by the wire 8. The wires forming the conductor being about equal in electrical length and being connected transversely when transverse connections are used only at equal potential points, as shown, the absence of cross-currents in the aerial or conductor produces a higher efficiency and a better form of waves. Where the connections are not between equipotential points, as in most forms of wire-netting, the losses may be large, especially when the netting consists of thinly-galvanized iron wire. This arrangement, like that of Fig. 1 of application Serial No. 177,829, gives large capacity distributed with substantial uniformity over a large fraction of the total length of the conductor. In some aspects it may be considered as the large single capacity surface of said Fig. 1 split up longitudinally into a plurality of smaller surfaces spaced apart laterally, though in the latter form very much smaller total surface area will give the same capacity effect and the same surface area will give a greater capacity effect. In constructing this form of the device the best results are to be secured by observing, first, that the separate longitudinally-extending conductors comprising the divided capacity area should be electrically connected in parallel relation with each other and in series with the ground connection or its equivalent; second, each of said electrically-parallel conductors should be of low resistance and of substantially equal electrical length; third, any cross connections should be between equipotential points, and, fourth, the aggregate or sum of the effective capacities per unit length of all of the parallel conductors should be the same at all distances along the capacity area, and the simplest way to insure this is to make each of said conductors of one uniform cross-sectional outline from end to end. It will also be found simplest to make said electrically-parallel conductors approximately parallel with each other geometrically and of one size of medium or large wire of low resistance. The distance between the wires forming the conductor should average about two feet for a conductor producing wave lengths of about six hundred to one thousand feet. The distance, however, will vary with the wave length produced or received and will be greater for longer wave lengths and smaller for shorter wave lengths, as was pointed out in a description of an early form of this device published in the *Electrical World and Engineer* August 12, 1899, in which the separation of the wires was expressed as a function of the wave length, the average separation there suggested being one-sixteenth of the wave length, that separation giving the best efficiency for each individual wire. This was determined experimentally by taking conductors of different lengths and spacing the wires at different distances apart and noting the point at which increasing the number of wires in the conductor did not produce a sufficiently marked increase in effect. It will be noted that though for a short wave lengths the wires must be so close together that there is little advantage in using this construction over the use of a capacity formed of a continuous metal sheet, yet when longer waves are used the effective distance of the wires is so great—*i. e.*, two feet apart for a conductor one hundred and fifty feet high—that there is a great advantage in using an open construction over using the continuous-surface cylinder, inasmuch as when an open construction is used we are unable to obtain practically all the electrical effects produced by a large-capacity area, such as a cylinder having continuous surface of sheet metal, while at the same time actually obtaining important structural advantages in that the small area of the wires is not affected by wind-pressure and has not the weight or cost of the sheet-metal cylinder.

I am aware that a superficial mathematical treatment of the question of the oscillations produced in a conductor having evenly-distributed inductance and capacity has given rise to the idea that strongly-marked harmonics are produced under these conditions. A competent mathematical investigation will, however, show that this is not the case. Although at the time of filing the application on which United States Patent No. 706,737 was granted no such complete mathematical investigation had been published, the results arrived at by me have been recently confirmed in a very brilliant treatise by McDonald, entitled *Electric Waves*, published by the University Press at Oxford, England, in 1902. In view of the very complete mathematical treatment given in this book it will be sufficient to refer to this treatise, in which it is stated, lines 3 to 11, page 132, to quote from the author, that "If the fundamental wave length of the resonator is nearly the same or less than the wave length of the oscillations sent out by the oscillator, the amplitude of the oscillation belonging to any of the overtones of the resonator will be small compared with the oscillations belonging to the fundamental tone, so that in such cases the observed positions of the nodes and the loops will be approximately the same as if the overtones of the resonator were not excited." The same author also points out the fact that a way to introduce harmonics is to employ a lump capacity, thus confirming the discovery previously made by me in 1899 and forming the basis of the statement made on page 5, lines 76 to 88, of application Serial No. 177,829 and of the invention claimed by me in Patent No. 706,339. It is pointed out by McDonald that by suitably increasing the lump capacity practically all the energy may be in the form of harmonics, and he shows that the harmonics which have been obtained by some experimenters were due to the presence of such lump capacities. By this it is not meant to be inferred that a pure resonant wave cannot be obtained with lump inductance and capacity if suitably arranged. It is found, however, that evenly-distributed inductance and capacity is capable of giving a pure sine wave, and for many purposes this method is preferable.

The mathematical results above referred to are borne out by experiments, and in application Serial No. 164,738, filed July 8, 1903, I have shown a resonant curve obtained from an aerial fifty feet high having its inductance and capacity evenly distributed, in which the resonant rise for the resonant wave length has eighty-eight times the value of that for a wave twenty per cent. higher or lower than that of the resonant wave length.

I have found by actual measurements that the capacity of a conductor with respect to ground is mainly dependent upon its size and shape and upon its distance from ground when the distance between the conductor and ground is not small.

What I claim is—

1. In a system for the transmission of energy by electromagnetic waves, a conductor consisting of a number of wires so arranged and proportioned as to radiate a substantially pure sine wave.

2. In a system for the transmission of energy by electromagnetic waves, a conductor consisting of a number of wires having low resistance.

3. In a system for the transmission of energy by electromagnetic waves, a conductor consisting of a number of wires having low resistance, and having large capacity.

4. In a system for the transmission of energy by electromagnetic waves, a conductor consisting of a number of wires suitably spaced, so as to produce the effect of a large-capacity area.

5. In a system for the transmission of energy by electromagnetic waves, a conductor consisting of a number of regularly-spaced wires arranged so as to produce the effect of a large-capacity area.

6. In a system for the transmission of energy by electromagnetic waves, a conductor consisting of a number of wires of equal electrical length arranged so as to produce the effect of a large-capacity area.

7. In a system for the transmission of energy by electromagnetic waves, a conductor consisting of a number of wires transversely connected only at equal potential points.

8. In a system for the transmission of energy by electromagnetic waves, a conductor consisting of a number of regularly-spaced wires having low resistance.

9. In a system for the transmission of energy by electromagnetic waves, a conductor consisting of a number of regularly-spaced wires and having large capacity.

10. In a system for the transmission of energy by electromagnetic waves, a conductor consisting of a number of wires of equal electrical length so as to form a conductor of low resistance and large capacity.

11. A sending-conductor for transmission of energy by electromagnetic waves, consisting of a number of wires so arranged and proportioned as to radiate a substantially pure sine wave.

12. A sending-conductor for the transmission of energy by electromagnetic waves, consisting of a number of wires having low resistance.

13. A sending-conductor for the transmission of energy by electromagnetic waves, consisting of a number of wires having low resistance, and having large capacity.

14. A sending-conductor for transmission of energy by electromagnetic waves, consisting of a number of wires suitably spaced, so as to produce the effect of a large-capacity area.

15. A sending-conductor for transmission of energy by electromagnetic waves, consisting of a number of regularly-spaced wires, so as to produce the effect of a large-capacity area.

16. A sending-conductor for transmission of energy by electromagnetic waves, consisting of a number of wires of equal electrical length, so as to produce the effect of a large-capacity area.

17. A sending-conductor for transmission of energy by electromagnetic waves, consisting of a number of wires transversely connected only at equal potential points.

18. A sending-conductor for the transmission of energy by electromagnetic waves, consisting of a number of regularly-spaced wires having low resistance.

19. A sending-conductor for the transmission of energy by electromagnetic waves, consisting of a number of regularly-spaced wires and having large capacity.

20. A sending-conductor for the transmission of energy by electromagnetic waves, consisting of a number of wires of equal electrical length so as to form a conductor of low resistance and large capacity.

21. A low-resistance conductor grounded at its lower end only and having the major portion of its length composed of a plurality of low-resistance conductors, said latter conductors having their individual capacities approximately evenly distributed throughout their length, substantially as set forth.

22. In a system of transmission of energy by electromagnetic waves, a conductor having the major portion of its length composed of a plurality of low-resistance wires, the average distance between said wires being great as compared with their diameters, substantially as described.

23. In a system of transmission of energy by electromagnetic waves, a conductor having a large fraction of its length composed of a plurality of low-resistance conductors of substantially uniform cross-sectional outline, spaced apart laterally and extended longitudinally to form a large capacity portion, substantially as set forth.

24. In a system for the transmission of energy by electromagnetic waves, a conductor for use as a radiator or collector of said energy, said conductor comprising a plurality of conductors of substantially uniform cross-sectional outline, spaced apart laterally, extended longitudinally and electrically connected to oscillate in parallel with each other and in series with a common ground, the length of each of said longitudinally-extending conductors being electrically the same and equal to a large fraction of the quarter-length in the surrounding medium of a wave having a time period equal to the natural free period of said conductor, substantially as set forth.

25. A sending-conductor comprising a plurality of longitudinally-extending low-resistance conductors of substantially uniform cross-sectional outline and spaced apart said longitudinally-extending conductors being of equal length electrically and electrically connected in parallel with each other and connected with the ground at one end only, for the purpose set forth.

In testimony whereof I have hereunto signed my name.

REGINALD A. FESSENDEN.

Witnesses:
C. A. LONGFELLOW,
WM. H. DE LACY.